: 3,523,937
PHLORIZIN ANALOGUES AND THEIR USE
Hyman I. Biegeleisen, 177 E. 75th St.,
New York, N.Y. 10021
No Drawing. Filed Nov. 6, 1967, Ser. No. 680,959
Int. Cl. C07c 47/18
U.S. Cl. 260—210                                  6 Claims

ABSTRACT OF THE DISCLOSURE

Phlorizin analogues useful for the elimination of glucose from animals.

---

This invention relates to new compositions of matter which are phlorizin analogues and useful for the elimination of glucose from humans and animals.

The primary aim of the phlorizin analogues of the invention is to bring about weight loss without requiring the human or animals to restrict his intake of food. In other words, with the aid of this invention, an obese individual may lose weight without dieting.

The weight loss follows well established physiological lines by making the kidneys permeable to sugar, notably, glucose. Lowering the renal threshold for sugar does not represent a departure from the natural functions of the body, since a low renal threshold for sugar occurs in many apparently healthy individuals.

Additionally, the drug is useful as a new approach in the treatment of diabetes mellitus. By draining off the excess glucose levels in the blood it may assist the body to cope with its inability to metabolize sugar. Also lowering the circulating blood sugar level would reduce or minimize the complications of diabetes such as skin furuncles and other infections.

In the special type of diabetes, known as obesity diabetes where an actual overweight problem exists along with a high blood sugar, these compounds are useful. By causing a loss of sugar with its attendant loss of weight the diabetic process and the accompanying paradoxical increase in insulin could be arrested completely. The products of the invention may be useful in emergency diabetic situations where phlorizin analogues could be used in conjunction with insulin or oral hypoglycemic agents.

Dangerous diabetic crises also exist in infectious states where alarming rises in blood sugar take place. Here too phlorizin analogues could be employed.

allied compounds may be effectively used to eliminate glucose:

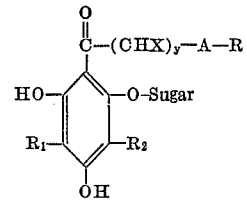

where R is a halogen, amino, halogenoalkyl, halogenoalkylthioalkyl or hydroxyl; A is a divalent hydroxyphenylene, hydroxyphenyleneoxy, phenyleneoxy, cyclohexylene, hydroxycyclohexylene, norbornylene, norborylene, phenylenethio, α-tolylenethio, phenylenesulfinyl, and halogenosubstituted derivatives thereof or where R and A jointly represent:

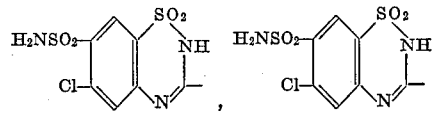

or

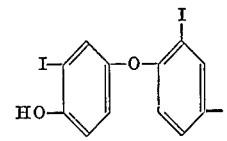

and $y$ is 1 to 3. Additionally, A may be an unsubstituted phenylene group where R is a halogen, amino, halogenoalkyl or halogenoalkylthioalkyl group. $R_1$ and $R_2$ may be hydrogen, a halogen group, mono- or polyhydroxyphenyl groups; the sugar radical may be derived from any sugar such as D-hexoses, glucose, mannose, and glactose or the D-pentoses, xylose and arabinose; and X may be hydrogen or an amino group.

The compounds of the invention may be prepared by a procedure similar to that used in the synthesis of phloretin and phlorizin (Zemplen and Bognar Ber., 75B, 1040 (1942) and 76B, 386 (1943)).

The synthesis, commencing with the condensation of phloroglucinol and acetyl phoretinonitrile, is followed by hydrolysis to yield phloretin. The phloretin is reacted with aceto-bromo glucose to form the phlorizin. The reaction proceeds as follows:

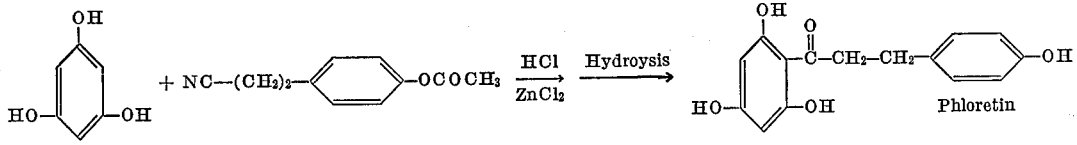

In addition to the uses set forth above, the phlorizin analogues would be useful for any condition where the reduction of sugar is beneficial.

Phlorizin has been known to cause glycosuria in humans and animals; however, because of its toxicity its administration could not be continued despite the desirability of the further removal of glucose from the animals system.

In accordance with this invention, it has been discovered that many of the following phlorizin analogues or

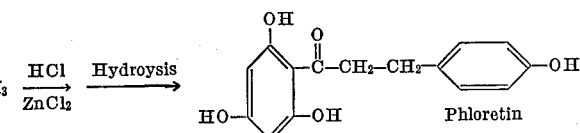

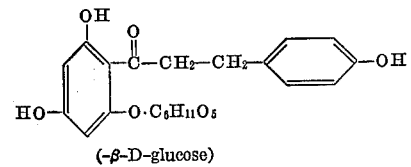

Phlorizin, $C_{21}H_{24}O_{10}$, mol wt. 436.40.

The preparation of the new compound described in the invention is somewhat analogous to the above reactions.

The phloretinic acid part of the molecule may be replaced by relatively simple compounds: p-halogenphenyl-propionitrile; -mono or di(chloro - bromo - iodo or fluoro - methyl) - 3 - phenyl propionitrile; 2,4-dichloro-(or dihalogeno) phenoxypropionitrile; analogous phenylmercapto, phenylsulfone or phenylalanine compounds. Similarly, the phloretinic acid may also be replaced by compounds related to thyroxine or beta [(3,5-diiodo-4-hydroxyphenoxy) - 3,5 - diiodophenyl] alanine, and chlorothiazide or hydrochlorothiazide related compounds.

Because of their diuretic properties the incorporation of hydrochloxothiazide and chlorothiazide groups are of particular interest. Representative compounds—the corresponding nitriles of which, as previously described, could be used to synthesize the analogues of the invention—are:

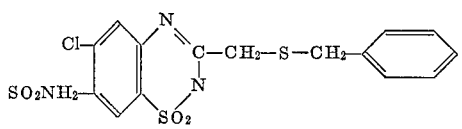

Benzthiazide Aquatag (Tuag) or Bxna (Robbins)

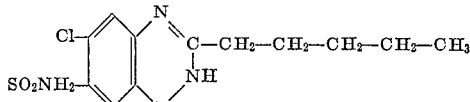

Described in J.A.C.S., 79, 2028 (Merck)

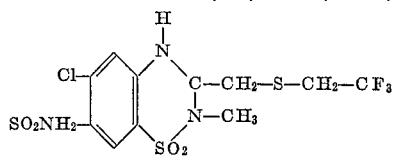

Polythiazide Renese (Pfizer)

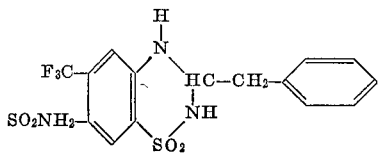

Benuron (Bristol)

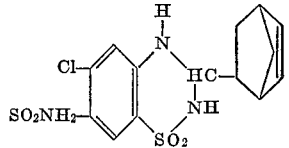

Anhydron (Lilly)

Example of the compounds used in the syntheses are:

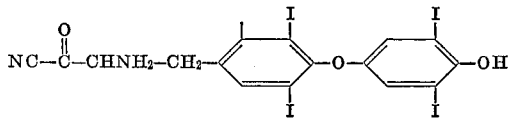

and

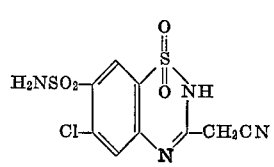

These nitriles may be synthesized by reacting 4-amino-5,6 - dichloro - 1,3 - benzenedisulfonamide with cyanoacetic acid or β-cyanopropionic acid to form the 3-cyanomethyl- and 3 - cyanoethyl analogues, respectively, of chlorothiazide. A similar reaction, wherein the cyanoacids are replaced by formic acid, is described by W. J. Close et al., J.A.C.S., 82, 1132 (1960). By conventional hydrogenation over a palladium catalyst, these chlorothiazide compounds may be converted into the hydrochlorothiazides. Alternatively, the hydrogenated ring compounds may be formed directly by reacting 4 - amino - 5,6 - dichloro-1,3-benzenedisulfonamide with acrolin to form:

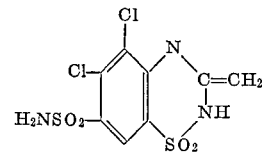

which can be reacted with sodium cyanide in the presence of bromine to form the desired cyano hydrochlorothiazide.

The phloroglucinol may be replaced by halogenated phloroglucinols, e.g. bromo- or iodo-phloroglucinol, and phloroglucide or diphlorglucin. These latter two compounds have 5 and 6 hydroxyl groups, respectively, and allow the introduction of more than one sugar unit or mixed sugar units into the final compounds and make it possible to modify the solubility of the novel compounds. The sugar or beta-D-glucose portion of the molecule may be replaced by galactose, mannose, xylose, or arabinose. If phloroglucide or diphloroglucin is used more than one and/or mixed sugar may be introduced in these new compounds.

Examples of the preparation of the compounds of the invention are set forth below. The following four examples show the replacement of the phloretinic acid portion of the molecule in the classical Zemplen and Bognar synthesis by acetyl phloretinonitrile:

EXAMPLE I

Using p-bromo-phenyl propionitrile in place of the acetyl phloretin nitrile the following series of reactions are performed to prepare 4,6-dihydroxy-2(β-D-glucoside)-β(p-bromophenyl)propiophenone:

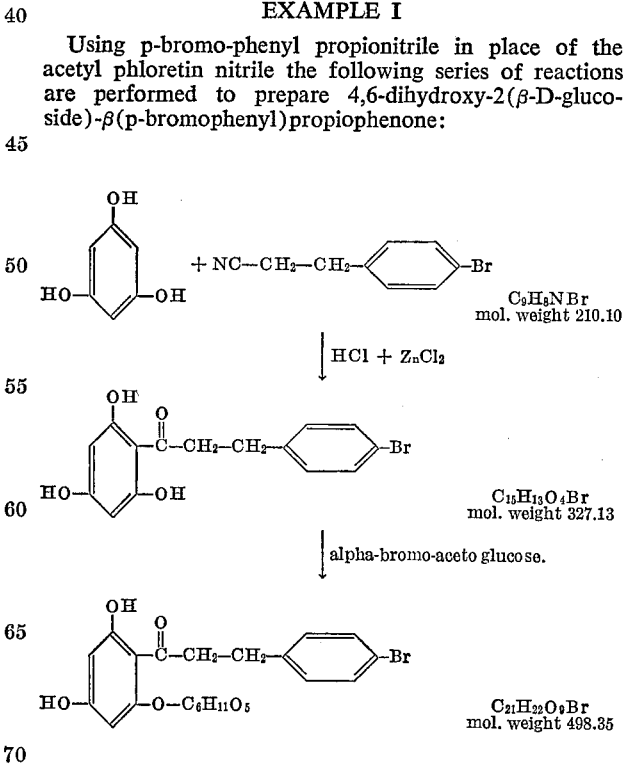

More specifically, to 13 grams dry phloroglucinol in 150 ml. absolute ethylether, add 20 grams dry p-bromophenyl-propionitrile plus 5 grams anhydrous zinc chloride. Stir, cool the mixture to —5 to 0° C. saturate at this temperature with anhydrous hydrogen chloride gas and keep the reaction product in the refrigerator for 3 days. After 3 days, wash the precipitate formed with 150 cc. ether, suspend in 300 cc. acidfied water, place on a steam bath and stir for one hour. Extract the solid wtih ethylacetate and recrystallize from methylalcohol. A yield of 10 grams of 2,4,6-trihydroxy-β-(p-bromophenyl)propiophenone is obtained. This latter compound is reacted with alpha-bromo-aceto glucose, according to the Zemplen-Bognar synthesis as previously discussed.

EXAMPLE II

Using phenylmercapto-acetonitrile the following series of reactions are performed:

EXAMPLE III

Using 3-cyanoethyl-5,6-dichloro-7-sulfamoyl-2H-1,2,4-benzothiadiazine-1,1-dioxide in place of the phloretinonitrile the following reactions are performed:

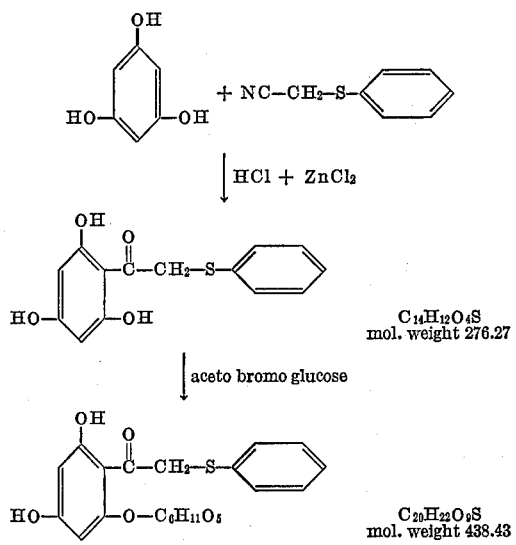

Prior to the last reaction the R group, which serves to protect the sulfamyl group, is removed by any conventional technique. This particular compound is outstandingly useful for it combines diuretic activity with the glycosuric activity of the phlorizin analogue.

EXAMPLE IV

Using acetylated thyroxine nitrile the following series of reactions are performed:

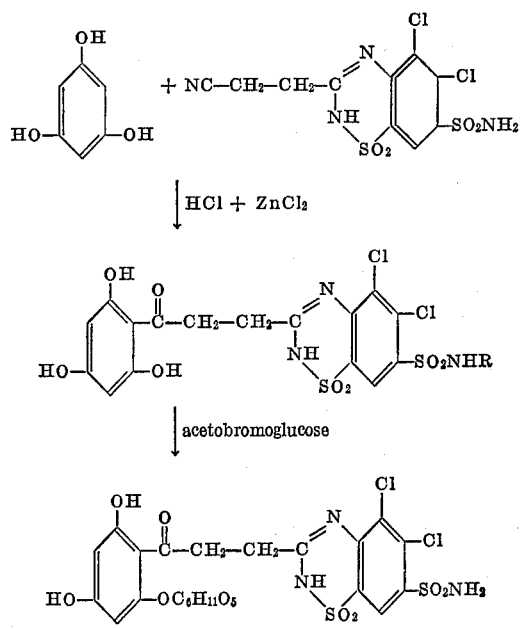

The following examples show compounds prepared by replacing the phloroglucinol portion of the molecule in the Zemplen and Bognar synthesis.

EXAMPLE V

Using iodo phloroglucinol (=2,4,6- trihydroxyiodobenzene) the following series of reactions are carried out:

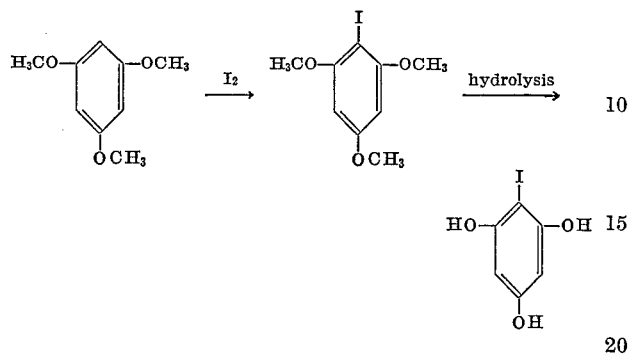

+ acetyl phloretino nitrile according to Zemplen and Bognar

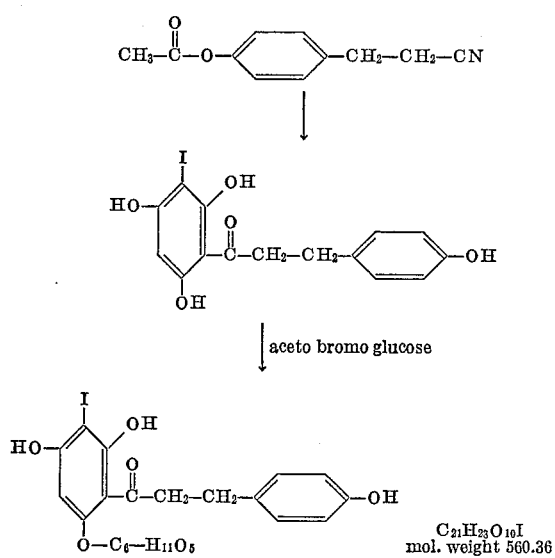

EXAMPLE VI

Using dipholoroglucin in the following reactions were performed:

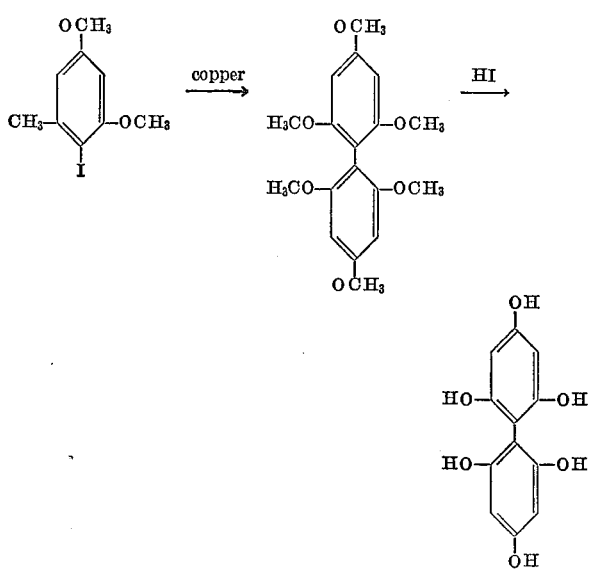

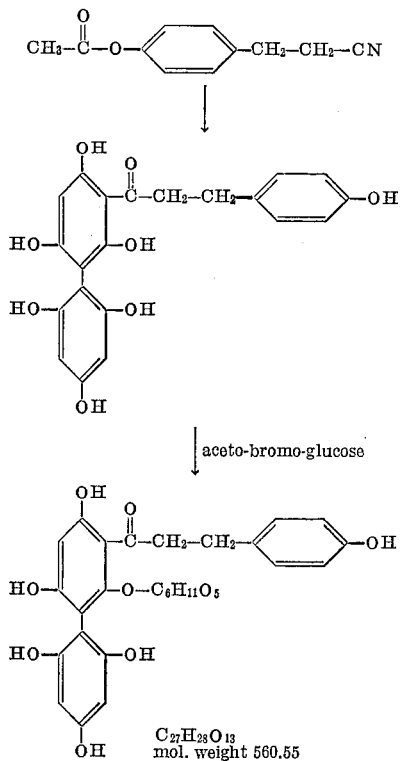

diphloroglucin + acetylphloretine nitrile ↓ (according to Zemplen and Bognar).

The following example shows replacement of the β-D-glucose part of the original o-phlorizin.

EXAMPLE VII

This example shows the condensation of phloretin with alpha-bromo-triaceto xylose, followed by hydrolysis to yield phloretin-2'-β-xyloside.

With ice cooling add 2.7 grams phloretin to 0.6 gram potassium hydroxide in 15 ml. water, then, also with ice cooling, a solution of 4 grams alpha-bromo-tri-aceto-xylose in 10 ml. acetone. Add enough acetone to form a homogeneous solution (approximately 10 ml.) and store at room temperature for 24 hours. Decant liquid and mix solid into 200 ml. water containing 0.5 ml. acetic acid. After the precipitate has solidified wash with about 50 ml. water and dissolve in about 30 ml. boiling methanol. After standing overnight at room temperature dissolve the precipitate in 10 ml. warm chloroform, filter the solution and reduce the volume of the filtrate to about 3 ml. in vacuo, then add about 20 ml. hot methanol or enough to yield a clear solution. After standing in the refrigerator overnight, filter and dry the precipitate formed. The yield of phloretin-2'-beta-xyloside is 0.7 gram.

The use and application of these novel compounds follows the pattern customary in today's medicine. Some of the compounds may be administered per os. Other compounds may be injected intravenously, intramuscularly, subcutaneously or into the specific organs of the animal. A third type of compounds may be applied to the epidermis, in suppositories, wound dressings, etc. All medications may be applied in simple or multiple doses over a short or extended period, by themselves, and in combination with other drugs. Appropriate dosages of the compounds range from 25 to 75 mg. per kilo for animals and from 1 to 5 mg. per kilo for humans, the frequency and mode of administration, and other conventional factors.

Combinations of the phlorizin analogues are of particular interest. For example, combinations of phlorizin analogous with anorexic drugs like amphetamine could produce a marked slimming action. This combination would act by depressing the appetite and draining blood sugar simultaneously.

Combinations of phlorizin analogoues with other diuretic drugs notably, the chlorothiazide group, would reduce blood sugar, eliminate fluid and also sodium plus varying degrees of potassium. This would be especially valuable in diabetes complicated by cardiorenal disease and where an individual is swollen with edema due to heart or kidney failure.

Combinations of three drugs could contain anorexic drugs, phlorizin analogues and diuretics for a triple effect. Also, combinations of this invention with oral hypoglycemic agents (such as, Diabinase, Orinase and DBI tablets) and with cathartics are useful.

The following examples illustrate the use of the phlorizin analogues of the invention:

EXAMPLE VIII

A litter of 6 white mice is treated by daily subcutaneous injections (thighs) of 4,6-D'-hydroxy-2-(beta-D glucosido) beta(p-bromophenyl)propiophenone in propylene glycol. This phlorizin analogue is prepared as described in Example I. The dose is adjusted at 50 mg. per mouse kilo (10 mg. per mouse).

The animals are fed usual diets containing cane sugar and the collected urine studied for quantitative glycosuria.

An increase in glycosuria at 300% is observed taking daily statistics both singly and for the group. At the end of the week blood sugar levels are found to be normal. The animals maintain good appetite but lose weight uniformly during the week.

What is claimed is:

1. A compound having the formula:

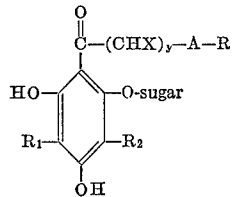

wherein R may be halogen, amino, halo lower alkyl, halo lower alkylthio lower alkyl or hydroxyl group; A may be a divalent hydroxyphenylene, hydroxyphenyleneoxy, phenyleneoxy, cyclohexylene, hydroxycyclohexylene, norbornlene, norborylene, phenylenthio, α - tolylenethio, phenylenesulfinyl, and halogen-substituted derivatives thereof or, where R is a halogen, amino, halo lower alkyl or halo lower alkylthio lower alkyl group, A may be an unsubstituted phenylene group, or where R and A jointly represent a chlorothiazide, a hydrochlorothiazide, or a (3,5-diiodo-4-hydroxyphenoxy) - 3,5-diiodophenyl group; $y$ may be 1 to 3; $R_1$ and $R_2$ may be hydrogen, a halogen group, mono or polyhydroxyphenyl groups; X is hydrogen or an amino group; and sugar is D-hexose or D-pentose.

2. The compound of claim 1 wherein the sugar is β-D-glucose.

3. The compound of claim 1 wherein the $R_1$ and $R_2$ are hydrogen.

4. The compound of claim 1 wherein the R and A are jointly a hydrochlorothiazide or a chlorothiazide group bonded at the 3-position to the carboxyl group of said compound.

5. The compound of claim 1 wherein X is hydrogen, $y$ is 2, A is a phenylene group and R is an hydroxyl group.

6. The compound of claim 1 having the formula:

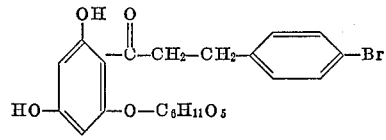

References Cited

UNITED STATES PATENTS 3,184,887  5/1965  Winter _____ 260—210

OTHER REFERENCES

Lewak et al.: "Chem. Abst.," vol. 65, 1966, p. 1051(b).

LEWIS GOTTS, Primary Examiner

J. R. BROWN, Assistant Examiner

U.S. Cl. X.R.

260—243, 465, 479, 592, 613, 620, 623; 424—180